United States Patent
Fine et al.

(10) Patent No.: US 9,768,889 B2
(45) Date of Patent: Sep. 19, 2017

(54) ADAPTIVE SYMBOL MAPPING MODULATION

(71) Applicant: MAXLINEAR ASIA SINGAPORE PRIVATE LIMITED, Singapore (SG)

(72) Inventors: Nadav Fine, Herzliyya (IL); Ran Soffer, Tel-Mond (IL)

(73) Assignee: Maxlinear Asia Singapore PTE LTD, Singapore (SG)

( * ) Notice: Subject to any disclaimer, the term of this patent is extended or adjusted under 35 U.S.C. 154(b) by 4 days.

(21) Appl. No.: 14/983,792

(22) Filed: Dec. 30, 2015

(65) Prior Publication Data

US 2017/0195066 A1   Jul. 6, 2017

Related U.S. Application Data

(60) Provisional application No. 62/267,018, filed on Dec. 14, 2015.

(51) Int. Cl.
| | |
|---|---|
| H04B 14/02 | (2006.01) |
| H04W 24/02 | (2009.01) |
| H04L 12/26 | (2006.01) |
| H04L 27/00 | (2006.01) |

(52) U.S. Cl.
CPC ......... H04B 14/02 (2013.01); H04L 27/0008 (2013.01); H04L 43/028 (2013.01); H04L 43/16 (2013.01); H04W 24/02 (2013.01)

(58) Field of Classification Search
None
See application file for complete search history.

(56) References Cited

U.S. PATENT DOCUMENTS

| | | | | |
|---|---|---|---|---|
| 5,621,762 | A * | 4/1997 | Miller | H04L 27/366 332/103 |
| 6,147,984 | A * | 11/2000 | McCoy | H04L 27/2614 370/342 |
| 2012/0069885 | A1* | 3/2012 | Chung | H04W 52/16 375/224 |

(Continued)

OTHER PUBLICATIONS

Wachsmann, U., et al., Multilevel Codes: Theoretical Concepts and Practical Design Rules, Jul. 1999, pp. 1361-1391, vol. 45, No. 5, IEEE Transactions on Information Theory, IEEE, Piscataway, New Jersey.

(Continued)

*Primary Examiner* — Freshteh N Aghdam
(74) *Attorney, Agent, or Firm* — McAndrews, Held & Malloy, Ltd.

(57) ABSTRACT

The continuous demand for capacity and the limited available spectrum in wireless and wired communication has led to reliance on advanced modulation techniques to dramatically increase the number of bits per hertz per second. This demand in capacity and using the higher order constellations shorten the link range, and as a result, system gain becomes an important characteristic. The modulation techniques described here improve the system gain by, e.g., as much as 2.5 dB in high order modulations such as 4096-QAM. The modulation techniques include reducing the peak to average ratio and adding shaping gain. These techniques dramatically improve the system capacity, system gain, power consumption and system cost.

10 Claims, 6 Drawing Sheets

(56) References Cited

U.S. PATENT DOCUMENTS

2013/0315343 A1* 11/2013 Murakami ............ H04L 1/0003
375/295

OTHER PUBLICATIONS

Quadrature amplitude modulation, Nov. 20, 2015, pp. 1-8, downloaded from Wikipedia, https://en.wikipedia.org/wiki/Quadrature_amplitude_modulation.
Mohammed, S.J., Implementation of Encoder for (31, k) Binary BCH Code based on FPGA for Multiple Error Correction Control, Aug. 2013, pp. 23-28, vol. 76, No. 11, International Journal of Computer Applications,.

* cited by examiner

ADAPTIVE SYMBOL MAPPING MODULATION

PRIORITY CLAIM

This application claims priority to provisional application Ser. No. 62/267,018, filed Dec. 14, 2015, which is entirely incorporated by reference.

TECHNICAL FIELD

This disclosure relates to communication systems, and in particular to modulation techniques for communication systems.

BACKGROUND

High-speed communication systems provide what is now indispensable worldwide data connectivity. In these systems, many different types of transceivers transmit and receive the signals that carry the data. The transceivers include modulators and demodulators as part of their signal processing chains. Improvements in modulators and demodulators will help enhance the communication capabilities of communication systems.

DETAILED DESCRIPTION

The continuous demand for capacity and the limited available spectrum in wireless (and in wired) communication has led to reliance on advanced modulation techniques to dramatically increase the number of transmitted bits per hertz per second. Using higher order constellations shortens the maximum distance between the transmitter and the receiver (the link range), and as a result, system gain becomes an important characteristic. The modulation techniques described below provide significant improvements to system gain for various modulation constellations, including 4K-QAM and 256-QAM constellations. The modulation techniques reduce the peak to average ratio and add shaping gain. These techniques dramatically improve the system capacity, system gain, power consumption and system cost.

Figure 1:
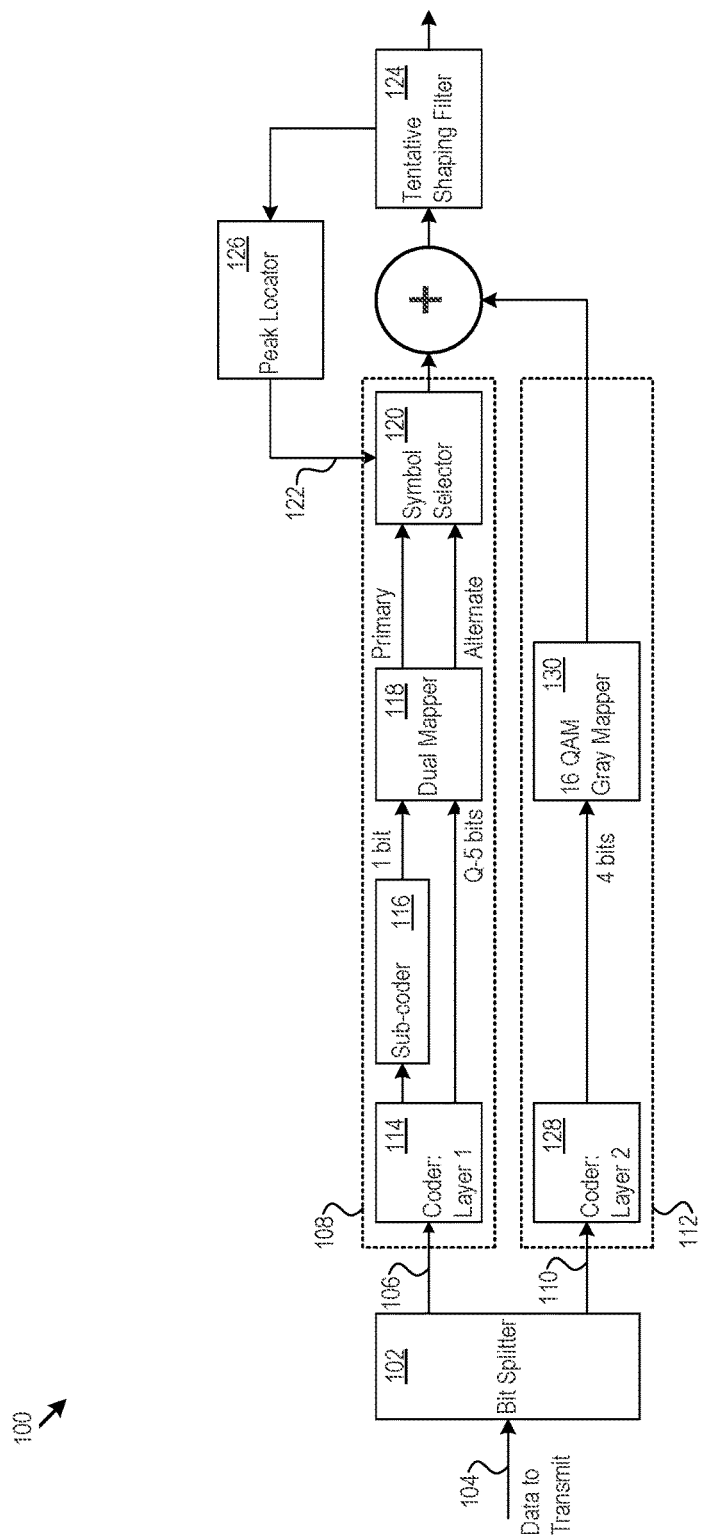
FIG. 1 shows an example implementation of a modulator.
Figure 2:
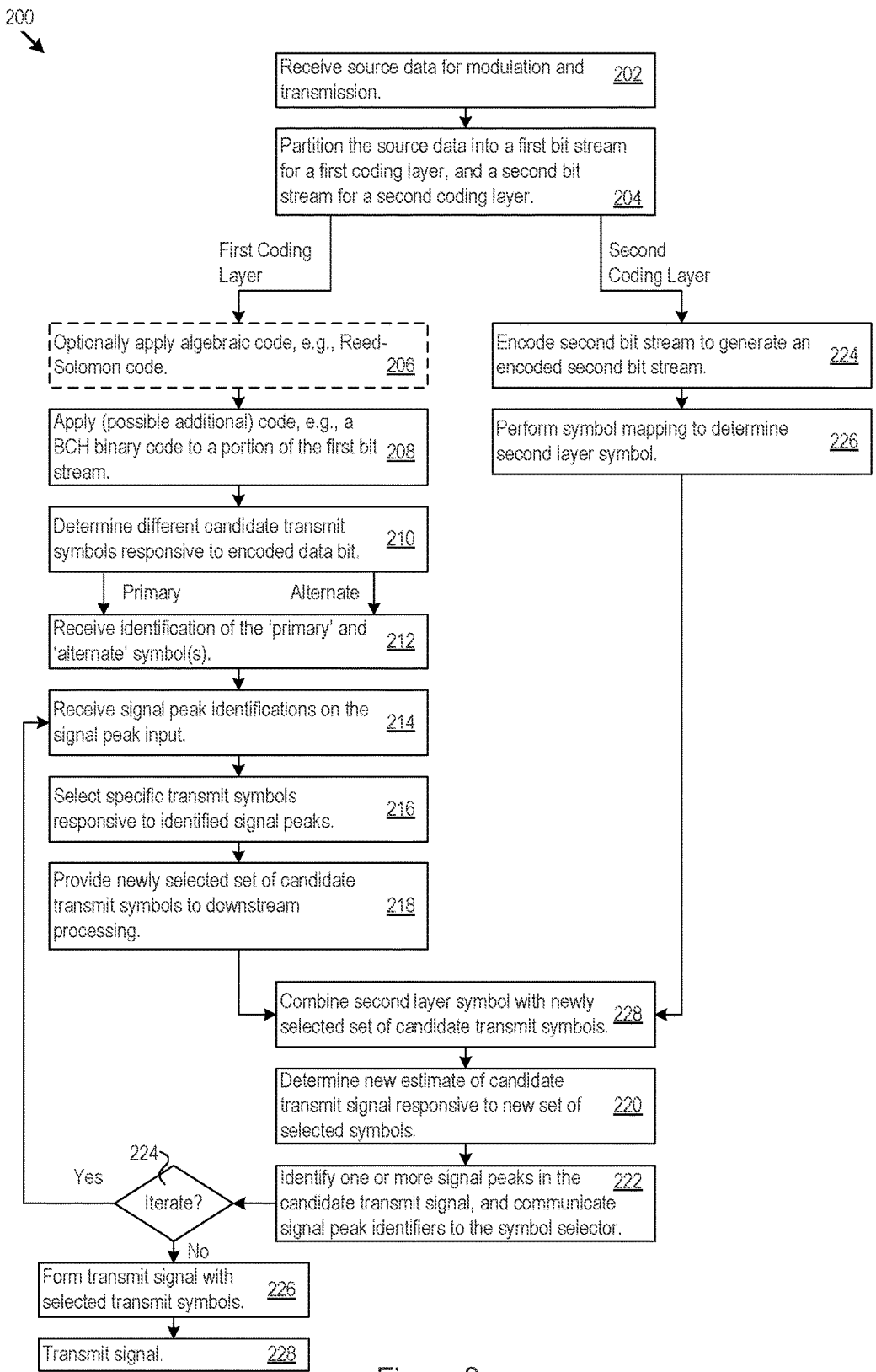
FIG. 2 shows logic that may be implemented in the modulator.

FIG. 1 shows an example implementation of a modulator 100, discussed below in connection with FIG. 2, which shows the processing logic 200 that the modulator 100 may implement. Other modulator variations are discussed below, along with an example demodulator. In FIG. 1, partitioning circuitry 102 receives source data 104 that will be modulated and transmitted (202) and partitions the source data 104 into a first bit stream output 106 for a first coding layer 108 and into a second bit stream output 110 for a second coding layer 112 (204). The partitioning may be responsive to the code rates in the first and second coding layer, with the partitioning circuitry 102 providing bits from the source data to meet those coding rates.

There may be one or more coders in the first coding layer 108. In the example in FIG. 1 the first coding layer 108 includes a first coder 114 and a second coder 116. The first coder 114 may apply an algebraic code, such as a Reed Solomon code (206). The second coder 116 may apply an additional binary code, such as a Bose-Chaudhuri-Hocquenghem (BCH) code, to a portion of the output of the first coder 114 (208). For instance, the second coder 116 may apply a binary code to one bit of the output, to generate an encoded data bit from the first bit stream. The first coder 114 is optional, and when it is not present, the second coder 116 operates on one or more bits output by the partitioning circuitry 102.

The first coding layer 108 also includes a symbol mapper 118 and a symbol selector 120. The symbol mapper 118 is configured to determine different candidate transmit symbols. The different candidate transmit symbols may be determined responsive to the encoded data bit (210), in connection with the (possibly encoded) remaining data bits in the first bit stream.

The different candidate transmit symbols may include a 'primary' and an 'alternate' symbol. The 'primary' symbol may correspond to the symbol that would nominally be chosen, given the source data, while the 'alternate' symbol may correspond to a candidate symbol that may reduce a signal peak in the transmit signal ultimately generated. The demodulator may correct for the transmission of the 'alternate' symbol due to the error correction coding performed by the second coder 116.

The symbol switching is performed according to the correcting capability of the second coder 116 and code length. For example, assume a BCH code with code word size $2^r-1$, redundancy size $r*k$, and correcting capability of 'k' errors. The switching between 'primary' and 'alternate' symbols is performed 'k' times for every $2^r-1$ symbols. Each time, a $2^r-1$ symbol set is collected, and 'k' times: a) the peak power instance is found and associated with a symbol, b) the symbol is switched (typically from 'primary' and 'alternate'), and c) the shaping filter output is updated according to the symbol switch.

Figure 3:
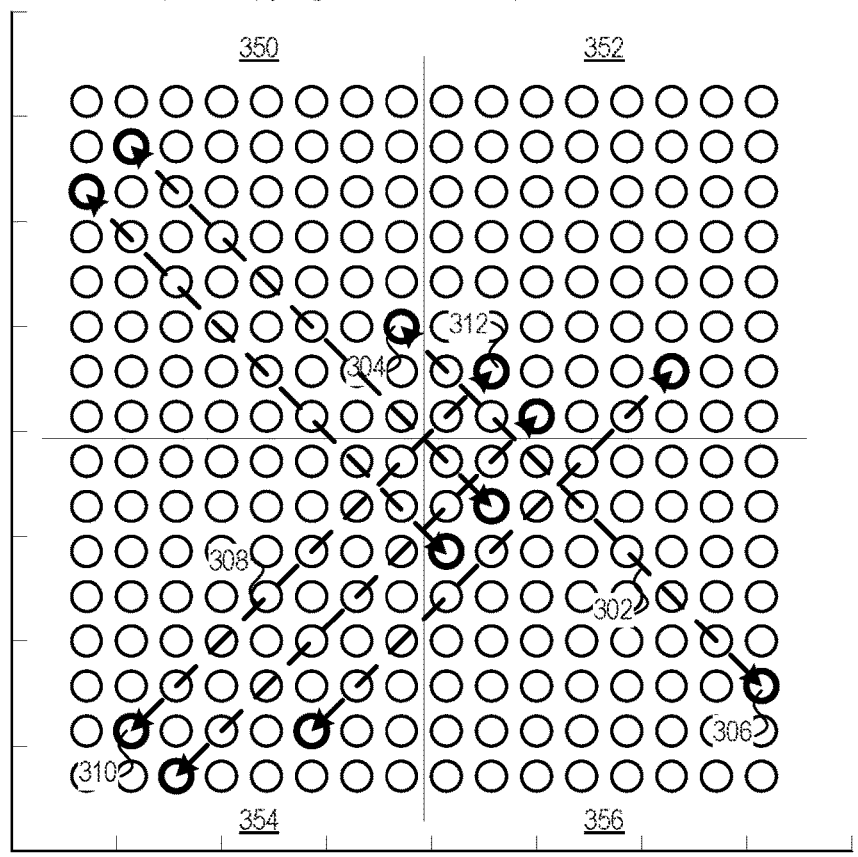
FIG. 3 shows a modulation constellation with mapping duos.

Turning ahead to FIG. 3, that figure shows a modulation constellation 300 of 256 symbols with several example mapping duos. This particular example shows the high 8 bits of a 4096 QAM constellation. Each mapping duo includes a 'primary' and 'alternate' symbol, and each symbol is included in a mapping duo. For instance, the mapping duo 302 includes the 'primary' symbol 304 and the 'alternate' symbol 306, with the mapping denoted by the dashed line between the two symbols. As another example, the mapping duo 308 includes the 'primary' symbol 310 and the 'alternate' symbol 312. The roles of the 'primary' and 'alternate' bits may change depending on the mapped bits. The duos in this example have the characteristic that if the 'primary' symbol is distant from the center, then the 'alternate' symbol is selected close to the center, and vice versa.

Note that the mapping duos in FIG. 3 are defined on a constellation of symbols that takes the shape of a square. In this example, each symbol in a given quadrant is mapped to the opposite quadrant, e.g., upper left quadrant 350 to lower right quadrant 356, and lower left quadrant 354 to upper right quadrant 352. Other mappings may be defined. Note, however, that a square constellation is not required, and that the modulator circuitry may define mapping duos on a constellation of any size or shape, including a square, circle, or other shape.

Returning to FIG. 1, the symbol selector 120 includes a signal peak input 122. The symbol selector 120 receives an identification (e.g. by index number) of the different candidate transmit symbols from the symbol mapper 118 (212). The symbol selector 120 also receives indications of signal peaks in a candidate signal for transmission on the signal peak input 122 (214). The symbol selector 120 selects specific transmit symbols from among the candidate transmit symbols responsive to the signal peak input (216). Note that selection may include choosing between multiple different 'primary' and 'alternate' symbol pairs for multiple different symbols to be transmitted based on signal peak feedback that identifies (e.g., by index number) multiple signal peaks in a candidate transmit symbol.

Expressed another way, the signal peak input 122 may receive an indication of one or more signal peaks in a candidate transmit signal. In response, the symbol selector 120 may choose candidate transmit symbols from among multiple pairs of 'primary' and 'alternate' symbols. One goal is to reduce the signal peaks in the signal actually transmitted. As the symbol selector makes decisions, it provides the new set of selected symbols to downstream processing (218). In one implementation, the shaping filter 124 may estimate or recompose a new candidate transmit signal given the new set of selected symbols (220) (and the input from the second coding layer 112). The peak locator 126 may then identify one or more signal peaks in the candidate transmit signal, and communicate the signal peak identifiers to the symbol selector 120 (222). The estimation and symbol selection may be iterative over any pre-configured number of iterations (224), time for iteration, or resource consumption threshold. In one implementation, the peak locator 126 associates a peak in the shaping filter output with a symbol by finding the symbol that contributed the most energy (or approximately the most energy) to the peak. Once the iterations are finished, the transmitter may compose a signal for transmission from the selected transmit symbols (226), and transmit the composed signal (228).

The modulator shown in FIG. 1 also includes a second coding layer 112. In the second coding layer 112, a third coder 128 may encode the second bit stream to generate an encoded second bit stream (224). As one example, the third coder 128 may be a soft decision coder, such as a low density parity check (LDPC) coder or turbo coder. A second layer symbol mapper 130 is also present and determines a second layer symbol responsive to the encoded second bit stream (226). As one example, the second layer symbol mapper 130 may be a multi-level QAM Gray mapper. The modulator 100 combines the second layer symbols with the newly selected candidate transmit symbols (228) as part of determining the candidate transmit signal.

The modulator 100 may be configured for any number, 'Q', bits per symbol. In the example in FIG. 1, the first coding layer 108 handles Q-4 bits, while the second coding layer 112 handles the remaining 4 bits. In this specific example, the second layer mapper 130 is a 16 QAM Gray mapper. The modulator 100 may implement other bit partitions. The first coding layer 108 and second coding layer 112 implement set partitioning that separates the source data bits. As a specific example, with six bits per symbol and a 64 QAM constellation, the modulator 100 may implement a division into four sets of 16 QAM, with four bits in the second coding layer 112 determining a particular symbol in the 16 QAM constellation, and the remaining two bits in the first coding layer 108 determining the 16 QAM set. Bit error rate (BER) tends to be low in the first layer, and as a result a high rate code may be applied by the first coder 114 in the first coding layer 108, if encoding is used at all.

Note that in the example of FIG. 1 there are three streams of symbol bits. One stream is output from the first coder 114 (e.g. Q-4 bits) or directly received as source data when the first coder 114 is not present, another stream is output from the second coder 116 (e.g., one bit), and a third stream is output by the third coder 128 (e.g., 4 bits). Each bit stream may be subject to different coding rates, and the coding rates may determine, on average, how many bits the partitioning circuitry 102 provides to the first and second coding layers.

Figure 4:
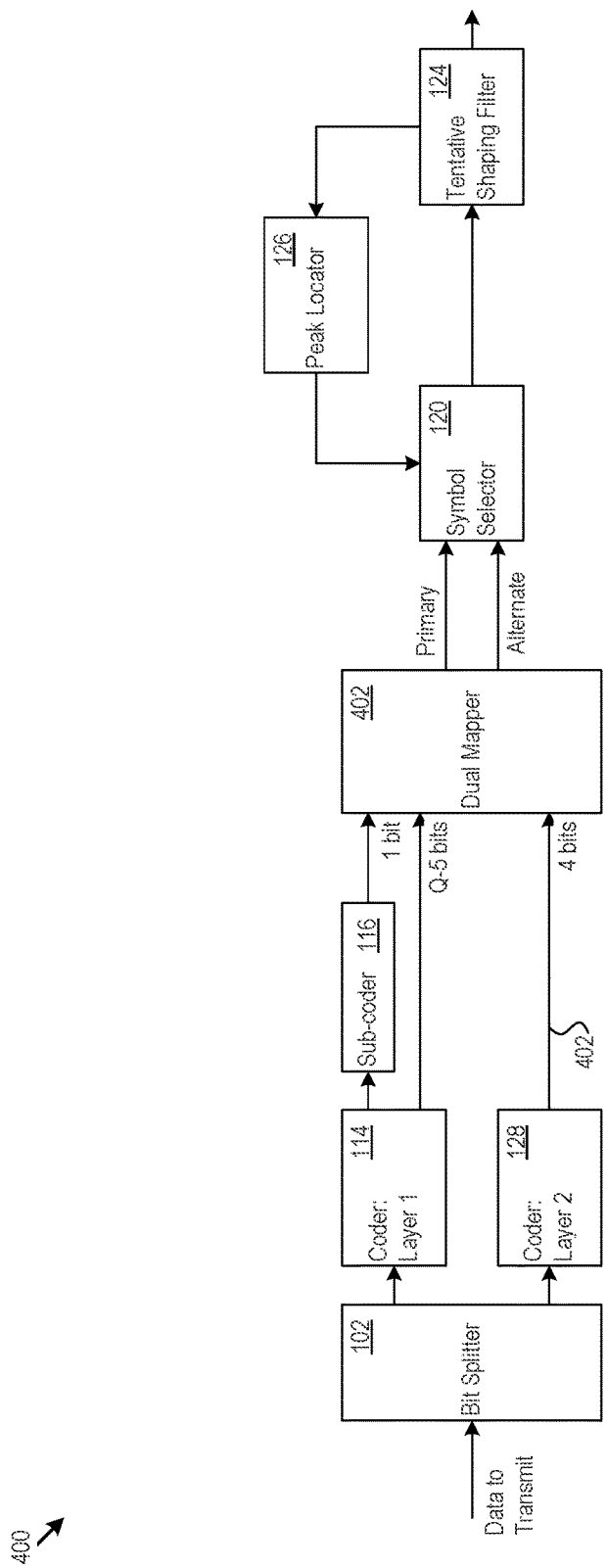
FIG. 4 shows another example implementation of a modulator.

FIG. 4 shows another example implementation of a modulator 400. In this example, the symbol mapper 402 selects the 'primary' and 'alternate' symbols from the same set in a set partitioned constellation. This selection allows labeling according to the following for 8-PAM: 011, 010, 100, 101, 111, 110, 000, 001. The low bit selection performs valid set partitioning on the constellation; however, the effect of the high bits is not an added constant to the Gray mapped low bits.

In FIG. 4, the layer 2 coder output 404 carries bits, 'b', that will be transmitted out on a particular transmit symbol. The symbol mapper 402 in the second layer may meet certain criterion with respect to those bits 'b'. In some implementations, the symbol mapper 402 meets the following criterion: 1) the constellation for both the 'primary' and 'alternate' symbols, with the layer 2 coder output constrained to 'b' bits, has $d_{min}$ increased by N (e.g., N=4 in the example of FIG. 4). This criteria means that after 'b' is determined in the decoder, the de-mapping of the remaining bits happens with a constellation with greater distance between symbols and is therefore significantly less prone to decoding errors; and 2) the mapping of those bits may optionally meet the Gray mapping criterion (e.g., one bit changes between adjacent symbols) to facilitate efficient decoding.

With respect in particular to an 8-PAM example, assume that the constellation set is {0, 1, 2, . . . 7} and there are two mapping options:

Option 1: if the mapping order is 011, 010, 000, 001, 111, 110, 100, and 101, then the symbol mapper in FIG. 1 applies, with the '+' operation/representation used to combine the outputs of the two coding layers 108 and 112. For instance, if the lower bit sets are mapped to {0, 1, 2, 3}, and the higher bit is mapper to {0, 4}, then the output mapped index is {high bit mapping output}+{low bit mapping output}.

Option 2: if the mapping order is 011, 010, 100, 101, 111, 110, 000, 001, then the two criteria noted above are met, but the mapper in FIG. 1 does not apply because the '+' operation/representation is not applicable.

Note that although the BER performance (assuming white Gaussian noise (WGN)) would be the same with both mappings noted above, when ASMM is applied the peak power is not necessarily the same for the two mappings. The difference in power may be a useful distinguishing factor to consider when any particular system is implemented.

Figure 5:
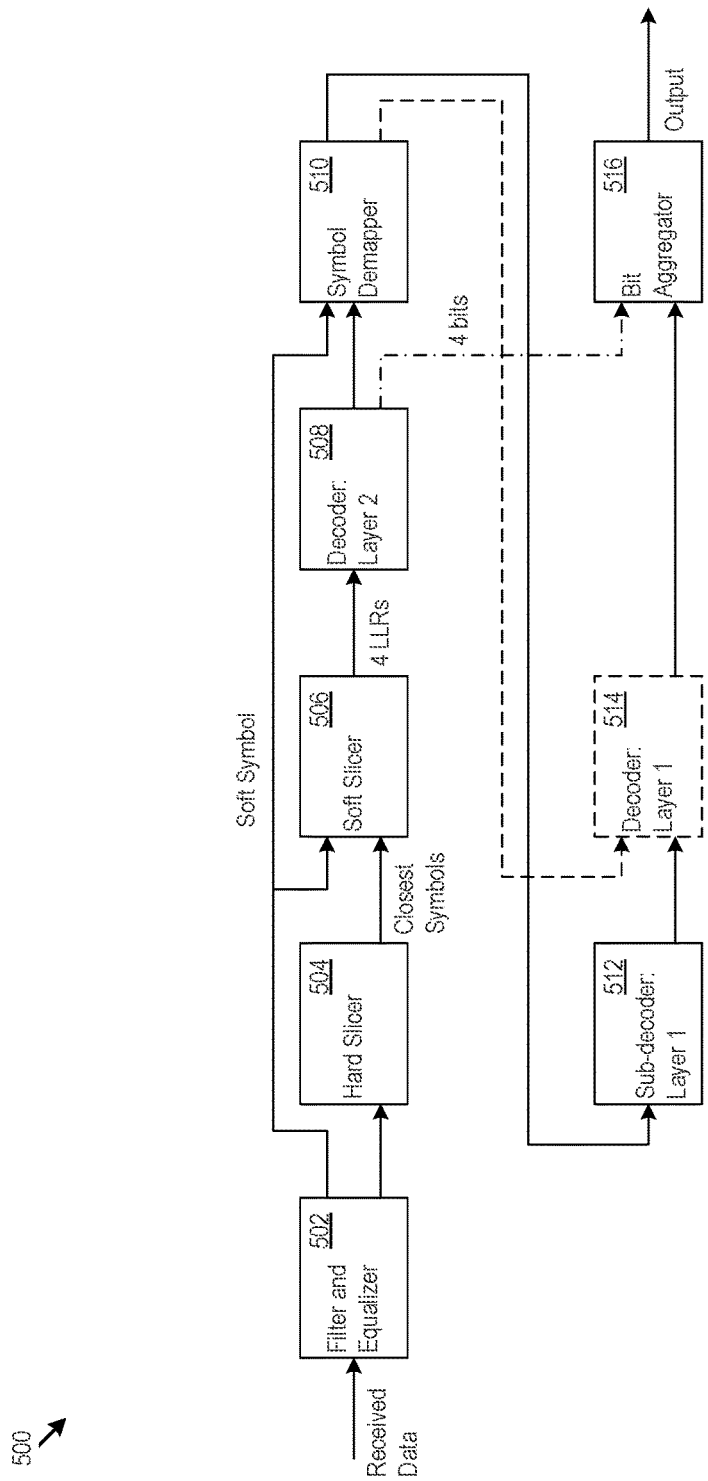
FIG. 5 shows an example implementation of a demodulator.
Figure 6:
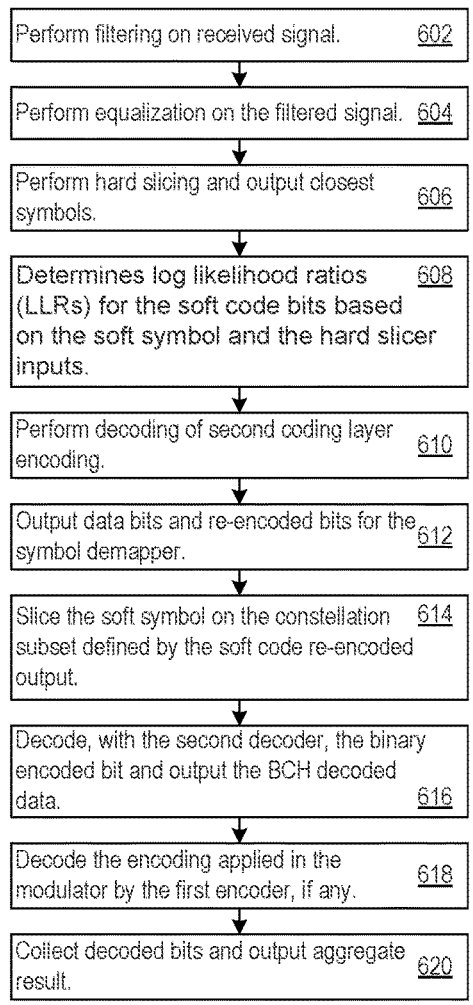
FIG. 6 shows logic that may be implemented in the demodulator.

FIG. 5 shows an example implementation of a demodulator 500. FIG. 5 is discussed below in connection with FIG. 6, which shows the processing logic 600 that a demodulator may implement. The demodulator 500 includes a filter and equalizer 502. The filter may implement matched filtering (602), for instance, and the equalizer may be linear or decision feedback equalization (DFE) to compensate for channel effects (604). The equalizer 502 outputs a soft symbol (606), e.g., a point estimated to be the transmitted symbol without regard to a predetermined constellation set.

The demodulator 500 includes an optional hard slicer 504 and a soft slicer 506. The hard slicer 504 finds the closest symbols for each of the soft symbol bits and outputs hard decisions as to those closest symbols (608). The soft slicer 506 determines log likelihood ratios (LLRs) for the soft code bits based on the soft symbol and the hard slicer inputs (610) or based on the output of the equalizer 502. The soft slicer 506 finds the most probable symbol or symbols given the output of the equalizer 502, with the LLRs calculated as a ratio of the associated probability or probabilities.

The soft code decoder 508 (e.g., the decoder counterpart to the third coder 128) decodes the soft code applied by the second layer coder 128. The soft code decoder 508 outputs both the data bits result for the bit aggregator 516 (e.g., the four bits encoded in the second coding layer 128) and the corresponding re-encoded bits for the symbol de-mapper 510.

The symbol de-mapper 510 slices the soft symbol on the constellation subset defined by the soft code re-encoded output (614). The second decoder 512 (for the first coding layer) may implement a decoder counterpart to the second coder 116, e.g., a BCH decoder. The second decoder decodes the binary encoded bit and outputs the BCH decoded data (616).

The output of the second decoder 512 and the output of the symbol de-mapper 510 undergo further decoding by the first decoder 514 (for the first coding layer) (618). That is, the first decoder 514 performs, e.g., algebraic decoding such as Reed-Solomon decoding, as the counterpart to the coding applied by the first coder 114 in the first coding layer 108. If no first coder 114 was used, then there is no corresponding decoding operation in the demodulator. However, the second decoder 512 still performs decoding of the binary code. This decoding operation corrects for the substitution of 'primary' symbols for 'alternate' symbols in the modulator as a natural result of the decoding operation. Finally, the bit aggregator 516 collects the decoded bits for the first layer and the second layer and outputs the aggregate decoding output (620).

The adaptive symbol mapping modulation (ASMM) techniques describe above effectively reduce transmit signal peaks. The modulator 100 may implement ASMM by implementing a division of the modulation constellation symbol set into subsets, e.g., by set partitioning. As one example, each subset may contain a single symbol (no partitioning). As another example, the subset may be a constellation that is the result of a single set-partitioning step (SSP). Note, however, that more than single set-partitioning is possible.

The modulator implements a division of each subset into, e.g., fixed-size mutually exclusive sets. One example is the symbol duos described above in which the set size is 2). Another example includes all of the sub-sets (and in this case there is no division step). The modulator 100 encodes the sub-set selection within the fixed-size sets on separate data bits. The modulator 100 protects these bits with a predetermined encoding technique.

The modulator 100 includes peak locator circuitry 126. The peak locator circuitry 126 associate peaks in the transmit waveform with symbol indexes. The peak location process determines (at least in approximation) which constellation symbols contribute the most energy to the largest peaks. The sub-set selection within the fixed-size set containing the symbol that contributed to the large peak is altered (e.g. by the symbol selector 120) within the set in a way that reduces the peak. The resulting peak reduction is used to increase the transmitter power, efficiency, or both. On the receive side, the demodulator 500 uses the encoding to reproduce the original symbol before the symbol substitution was performed.

The ASMM technique is widely applicable in many different communication systems. One example is modem applications. More particularly, ASMM may be an integral part of any wireless or wireline communication, particularly those with high order modulation. Examples include microwave, satellite, WiFi, LTE, 5G, and optical transceivers.

It is very common for carrier modems to use a shaping filter (such as a root-raised cosine filter) to control the output spectrum bandwidth. The modem then maps the peak output power from the shaping filter to the peak output power of the transmit amplifier chain to maximize the utilization of the power amplifier (PA). Denote by R the ratio between the peak power at the output of the shaping filter and $d_{min}^2$ which is the minimum distance in the constellation set. ASMM essentially decreases R while maintaining $d_{min}^2$ intact. By doing so, ASMM maintains the BER performance while the maximal output from the transmit amplifier decreases. This in turn allows an increase in the transmit power by introducing additional amplification. The additional amplifications results in a proportional link performance improvement.

ASMM can achieve significant system gains for many different types of modulation constellations. The gains provide significant performance increases for wireless communication as well as wireline communication. These performance increases translate directly to an increase in the link budget or increase in the payload, and thereby to the link maximal range and available payload.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

The invention claimed is:

1. A modulator system comprising:
a symbol mapper comprising a data input and configured to determine different candidate transmit symbols for the data input;
a symbol selector comprising a signal peak input and configured to:
receive an identification of the candidate transmit symbols from the symbol mapper; and
select a specific transmit symbol from among the candidate transmit symbols responsive to the signal peak input; and
a peak locator configured to:
locate a signal peak in a candidate transmit signal; and
identify the signal peak to the symbol selector on the signal peak input.

2. The modulator system of claim 1, comprising a shaping filter configured to generate the candidate transmit signal.

3. The modulator system of claim 2, wherein the shaping filter is further configured to generate the candidate transmit signal responsive to a symbol selection output from the symbol selector.

4. The modulator system of claim 1, wherein the symbol mapper and the symbol selector comprise a portion of a first coding layer that provides a first layer coding output; and
wherein the modulator system comprises:
a second coding layer configured to provide a second layer coding output; and
a shaping filter configured to generate the candidate transmit signal from the first layer coding output and the second layer coding output in combination.

5. The modulator system of claim 4, wherein the modulator system comprises a bit splitter configured to partition source data to be modulated into:
a first bit stream for the first coding layer, and
a second bit stream for the second coding layer.

6. The modulator system of claim 5, wherein:
the first coding layer comprises coding circuitry operable on a subset of the first bit stream to generate a coded output, and
the symbol mapper is configured to determine the multiple different candidate transmit symbols responsive to the coded output.

7. The modulator system of claim 1, wherein the multiple different candidate transmit symbols comprise a nominal constellation symbol for the data input and an alternate symbol to the nominal constellation symbol for the data input.

8. The modulator system of claim 7, wherein the symbol selector is operable to select the alternate symbol for transmission responsive to the signal peak.

9. A modulator comprising:
bit partitioning circuitry comprising:
a first bit stream output for a first coding layer; and
a second bit stream output for a second coding layer;
in the first coding layer:
a first coder operable to generate an encoded data bit from the first bit stream; and
a first layer symbol mapper configured to determine different candidate transmit symbols responsive to the encoded data bit;
a symbol selector comprising a signal peak input and configured to:
receive an identification of the different candidate transmit symbols from the first layer symbol mapper; and
select a specific transmit symbol from among the candidate transmit symbols responsive to the signal peak input; and
a peak locator configured to:
locate a signal peak in a candidate transmit signal; and
identify the signal peak to the symbol selector on the signal peak input;
in the second coding layer:
a second coder operable to generate an encoded bit stream from the second bit stream; and
a second layer symbol mapper operable to output a second layer symbol responsive to the second bit stream; and
a shaping filter operable to determine the candidate transmit signal from a combination of the specific transmit symbol and the second layer symbol.

10. The modulator of claim 9, wherein:
the first coding layer further comprises a third coder operable to generate an encoded first bit stream, and:
the first coder comprises a binary coder operable to generate the encoded data bit from the encoded first bit stream.

* * * * *